Figure 9:
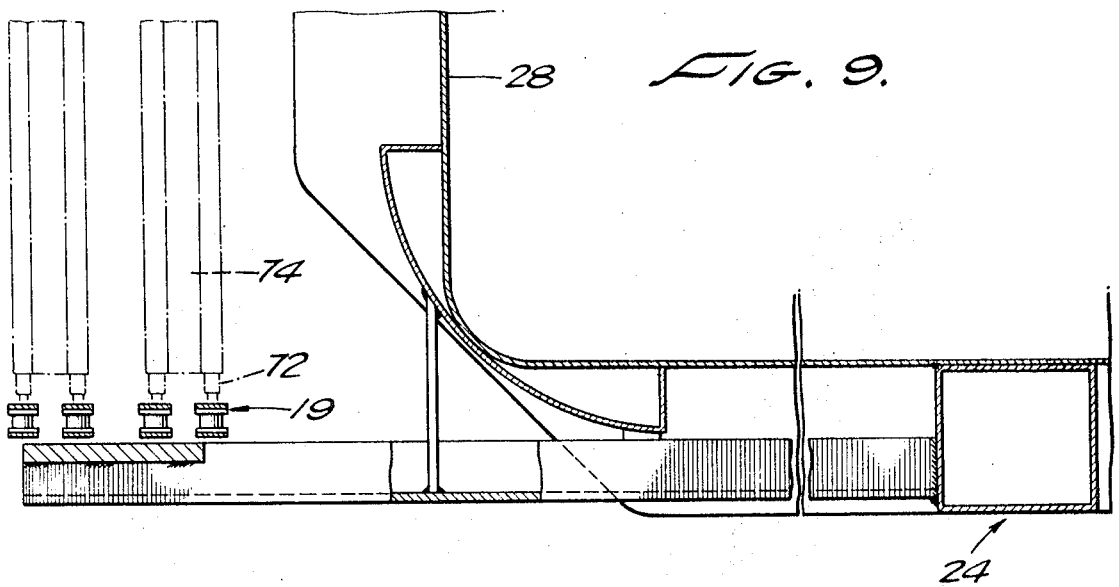

United States Patent

[11] 3,586,365

[72] Inventors Rufus F. Dickson
525 Arbolado Drive, Fullerton, Calif. 92653;
Lawrence C. Funder, 7845 East Eighth St., Downey, Calif. 90240
[21] Appl. No. 857,183
[22] Filed Sept. 11, 1969
[45] Patented June 22, 1971

[54] RETRACTABLE LOAD COVER FOR A VEHICULAR CONTAINER
10 Claims, 16 Drawing Figs.
[52] U.S. Cl. .................................................. 296/137
[51] Int. Cl. .................................................. B60j 7/10
[50] Field of Search ...................................... 296/100, 98, 137; 105/377

[56] References Cited
UNITED STATES PATENTS
3,072,432  1/1963  Ohle .......................... 296/137
3,416,835  12/1968  Ohle .......................... 296/100
3,416,834  12/1968  Morse, Jr. ..................... 296/100

Primary Examiner—Leo Friaglia
Assistant Examiner—Robert R. Song
Attorney—Beehler, Arant & Jaggar ABSTRACT: A lightweight, retractable cover for a trash trailer including a flexible cover which is supported between a pair of conveyor chains. A pair of straight tracks are provided on the upper longitudinal edges of the trash trailer for supporting the cover in its closed position. A pair of folding pathways are provided for the conveyor chains on the front end of the trailer, these pathways being aligned in a generally vertical plane, so that the top of the trailer may be opened by drawing the cover forward and thence down the front of the trailer into a folded up position. The chains are driven in reverse to return the cover to its closed position.

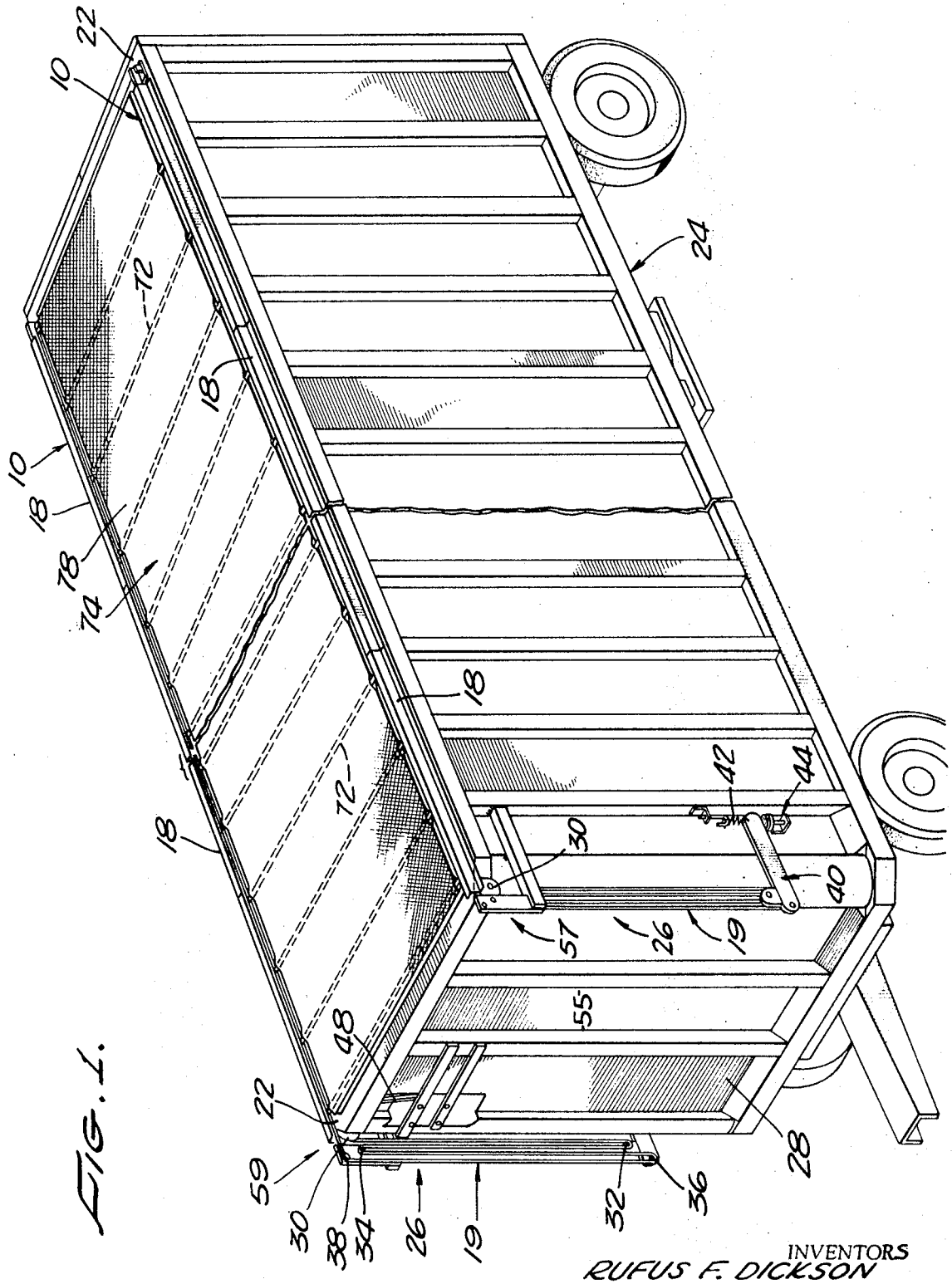

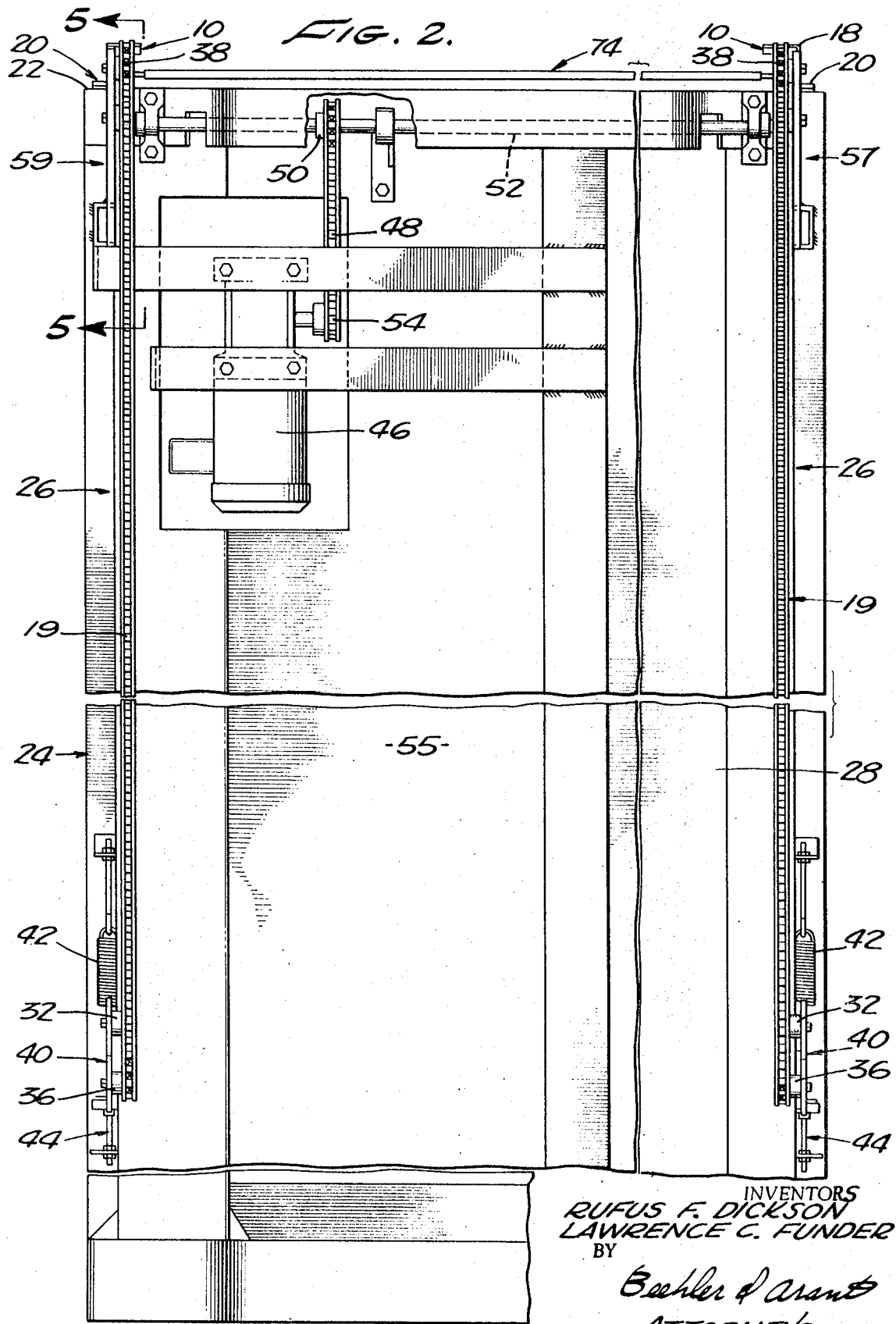

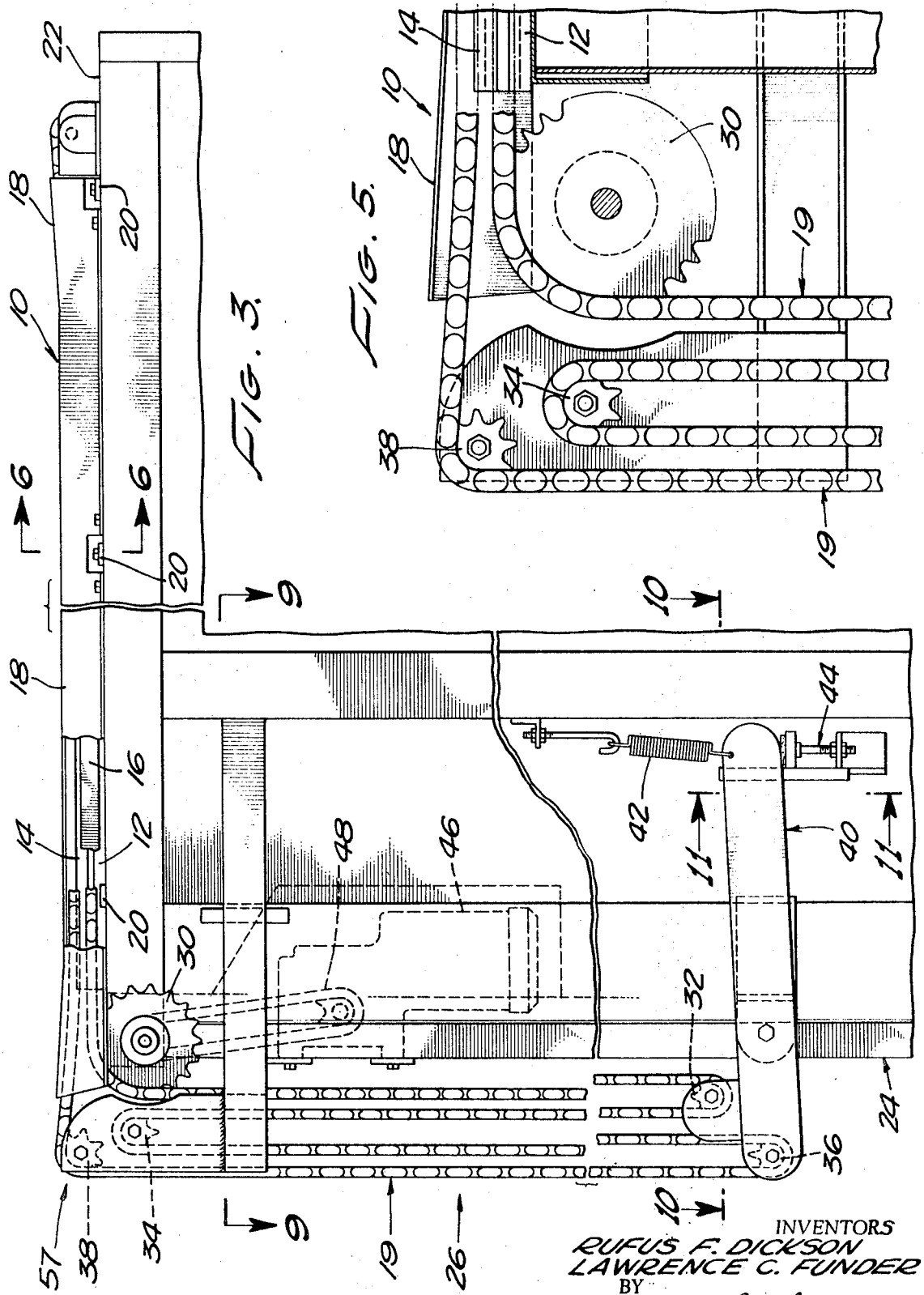

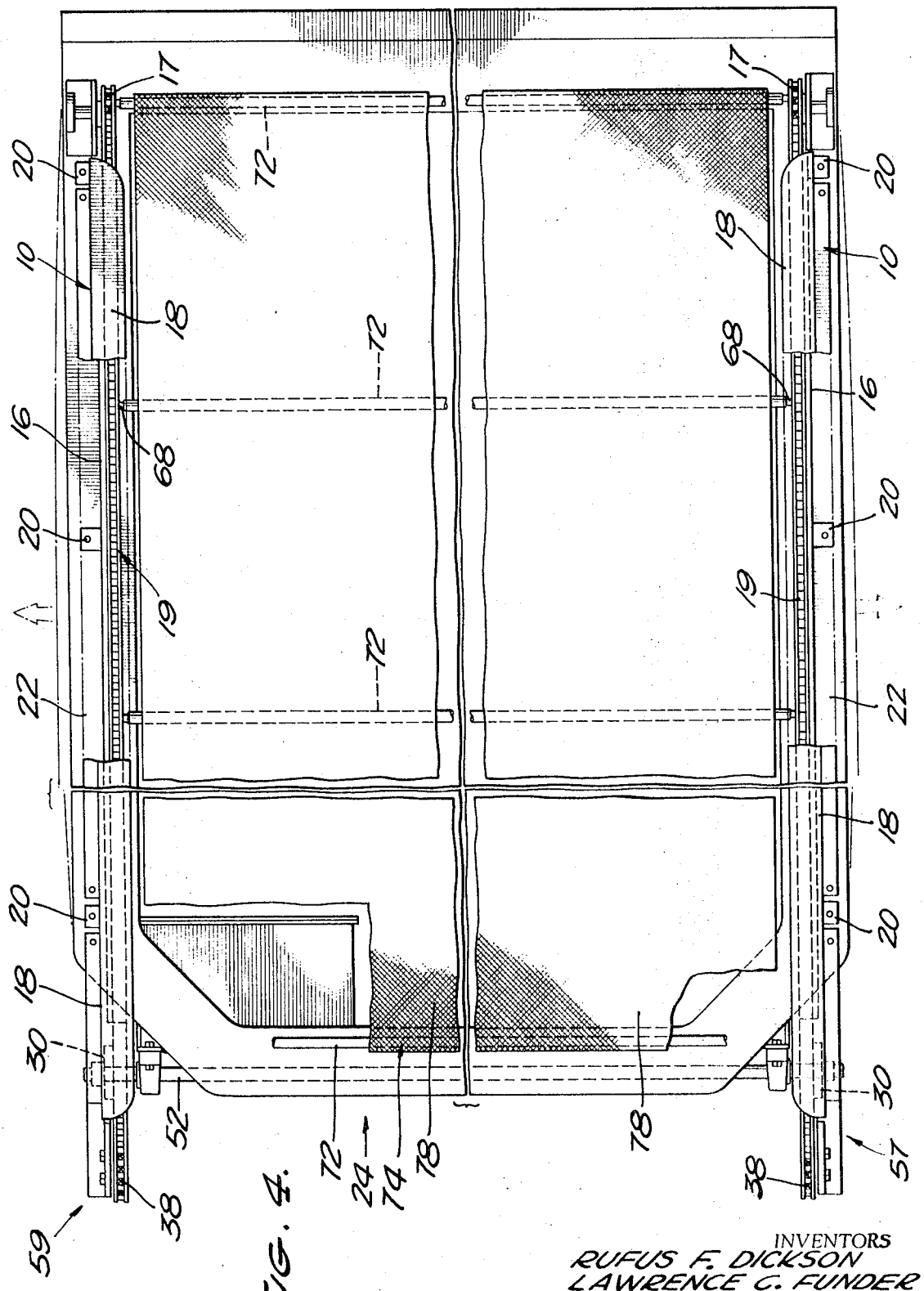

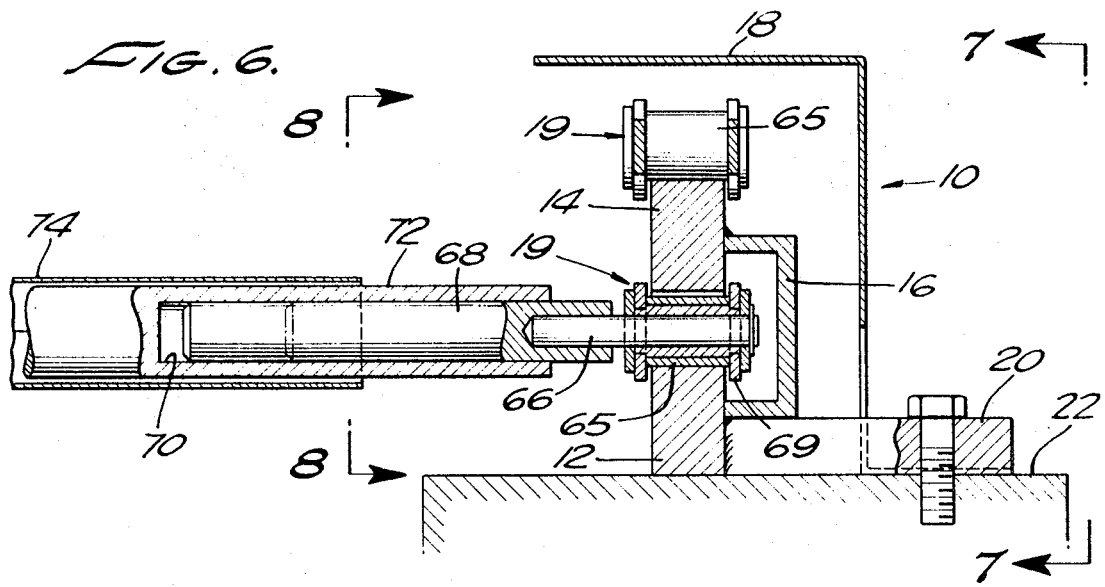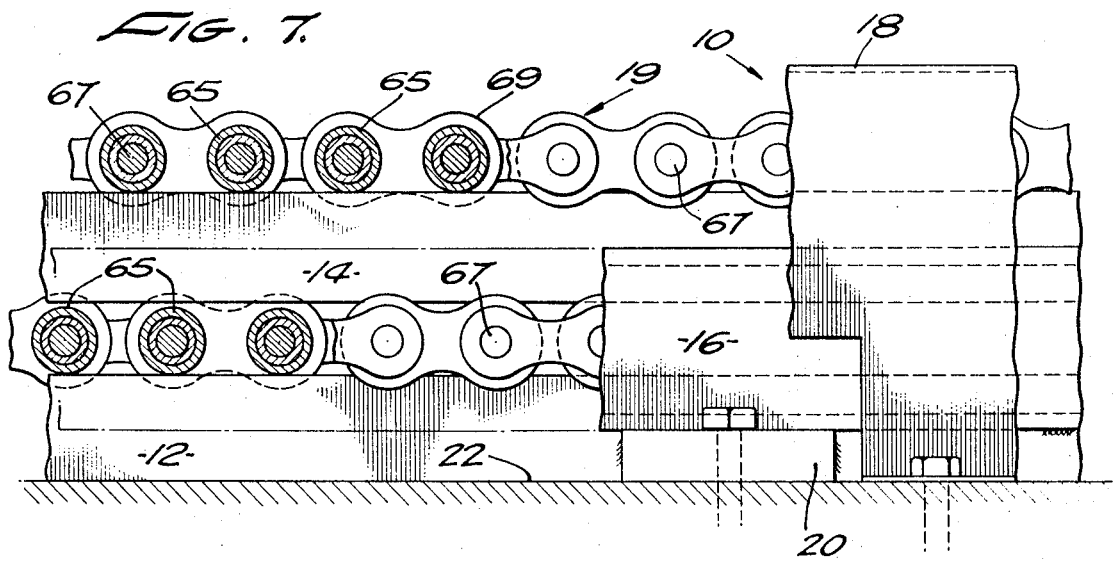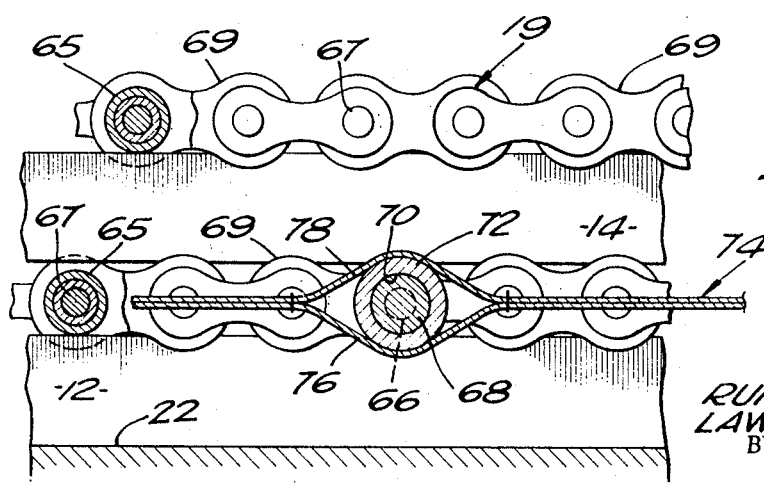

INVENTORS
RUFUS F. DICKSON
LAWRENCE C. FUNDER
BY
Buehler & Arant
ATTORNEYS

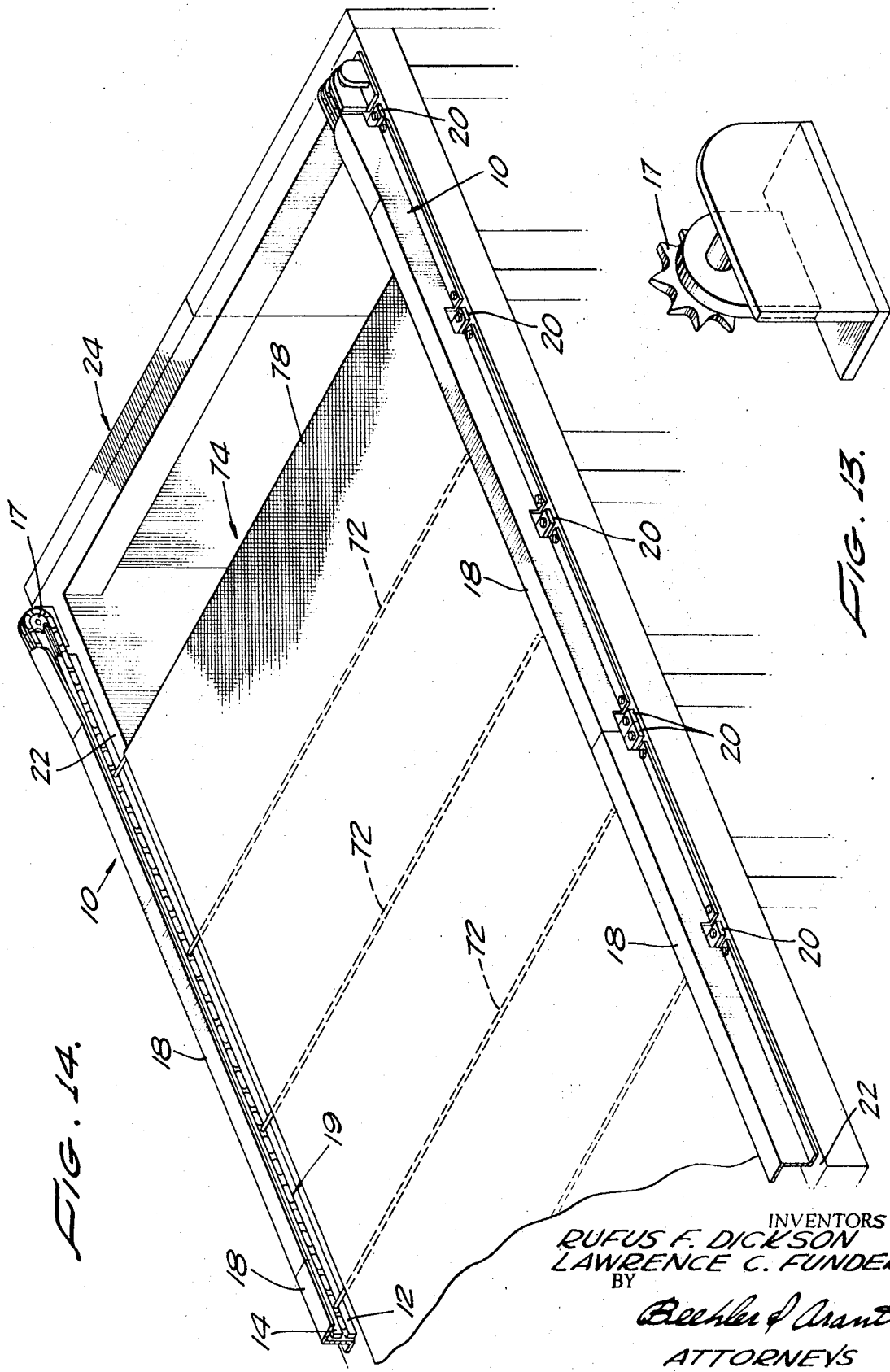

INVENTORS
RUFUS F. DICKSON
LAWRENCE C. FUNDER
BY
Beehler & Arant
ATTORNEYS

RETRACTABLE LOAD COVER FOR A VEHICULAR CONTAINER

Previously considerable difficulty had been encountered in providing a satisfactorily operating cover for transport vehicles. Previous devices generally require considerable manual manipulation by the operator, were time consuming to operate, and required considerable maintenance, effort and expense.

According to this invention, these and other difficulties of the prior art have been overcome by providing a retractable cover which is carried between two conveyor units which are driven simultaneously. The cover is of a flexible, lightweight material and is supported on longitudinally expandable supports so as to accommodate variations in distances between the conveyor units when the sides of the transport vehicle bulge outwardly due to the presence of a heavy load inside the vehicle body. When the cover is in the fully extended position over the open vehicle top, it is supported by the respective conveyor units on either side so that it substantially covers the entire opening. When it is desired to retract the cover, the conveyor units are actuated simultaneously, and the cover is carried back to a series of closely spaced overlaying folds at the front side of the trailer. In its completely retracted folded position, the cover lays entirely within the folding zone at the front side of the vehicle, leaving the top completely free of any covering structure.

The retractable cover of this invention is particularly suited for use with trash trailers. Trash trailers are generally required to carry large quantities of voluminous materials. For this reason the trash trailer is constructed with a height very nearly equal to the maximum height permitted by applicable governmental regulations and physical laws. It is necessary to cover these vehicles while they are being moved from one location to another so as to prevent trash from blowing out of them. The present retractable cover structure is supported and moved by a conveyor system which has a very low profile on the top of the vehicle. This permits the height of the vehicle to be maintained within the necessary limits. The compact folding zone at the front side of the vehicle permits the cover to be folded away in a small space without interfering with the use of the trailer. In general, the available space along the top of the trailer is about 3 inches or less and that at the front of the trailer is about 6 inches. The cover is generally supported between the conveyor units on telescoping rods placed at regular intervals. These rods are anchored at their respective outer ends to the movable portions of the conveyor units. The spacing between these rods along the length of the cover remains the same in both the extended position and the folded configuration. In this way the flexible cover is not subjected to any tightly compressed folding action which might tend to cause excessive wear or entanglement of the cover during folding or unfolding. The telescoping action of the cover support rods compensates for the flexing of the transport vehicle sides without placing any strain on the cover itself.

Figure 10:
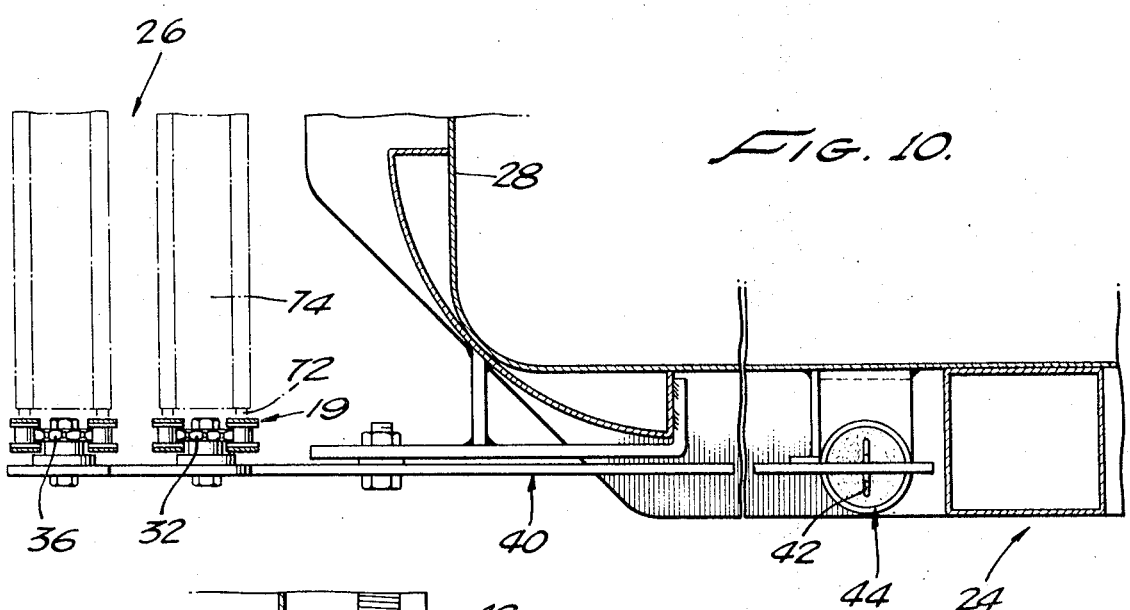
Figure 11:
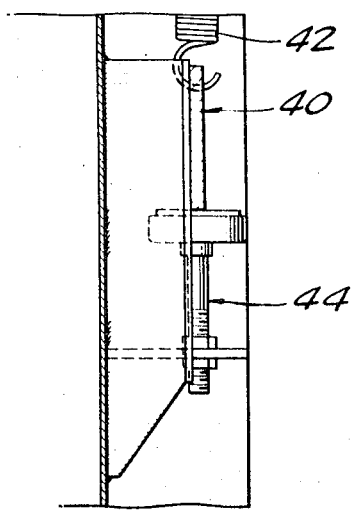
Figure 12:
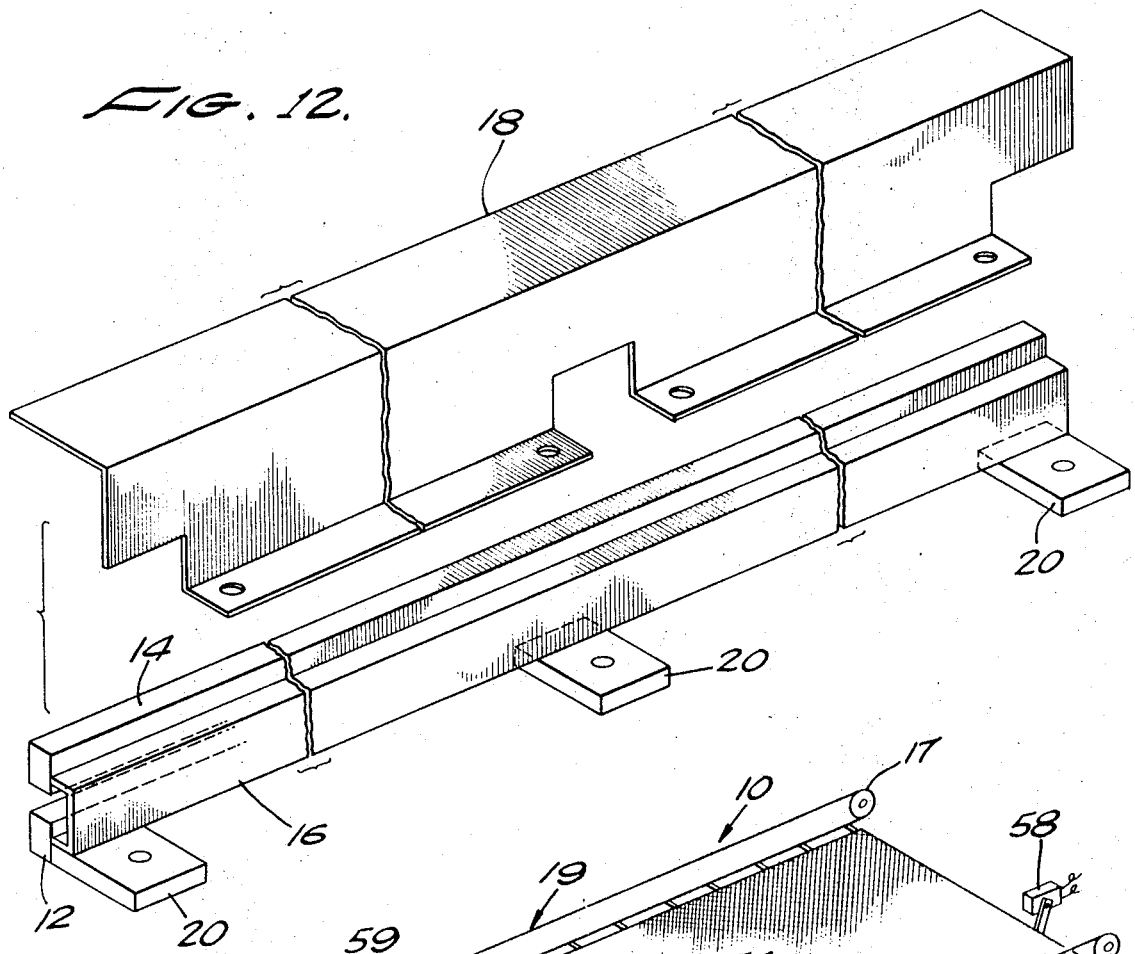
Figure 16:
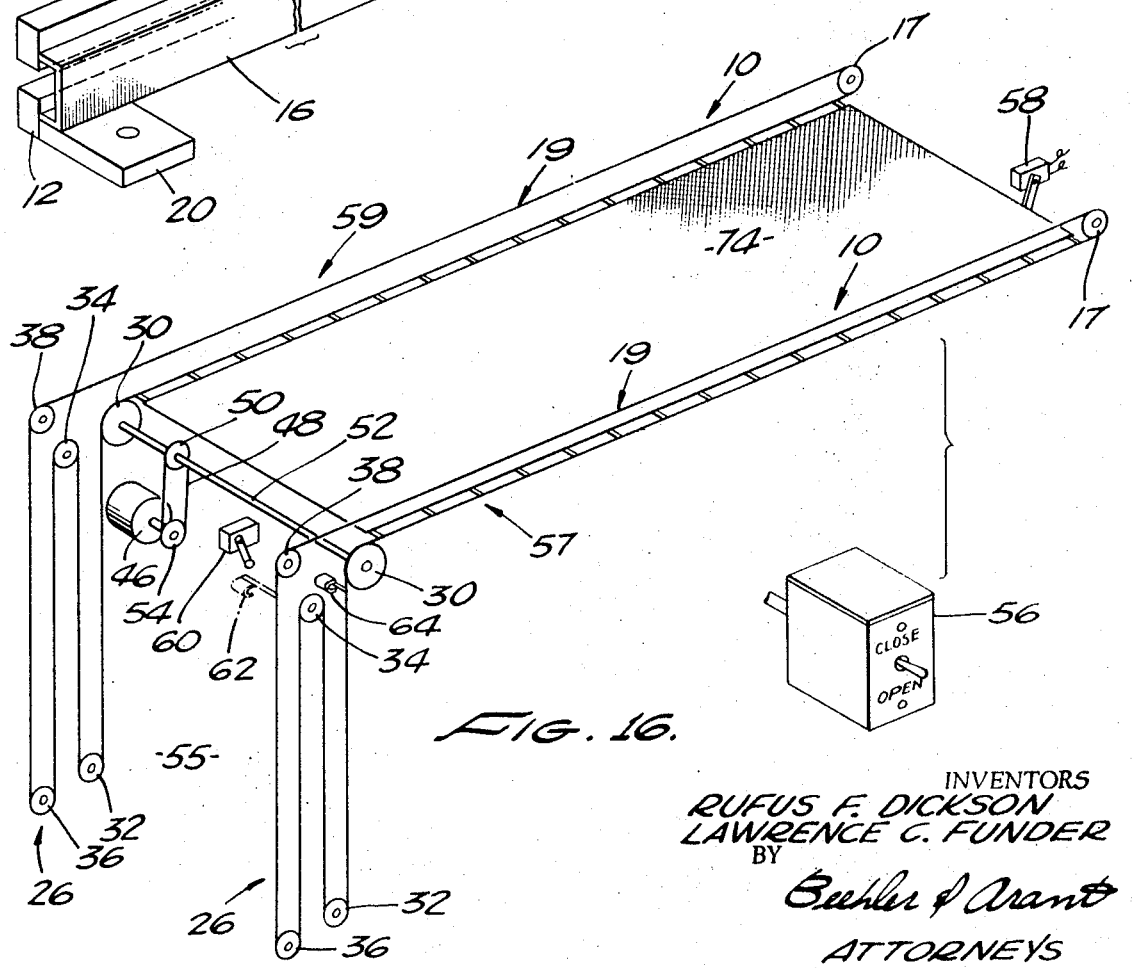
Figure 15:
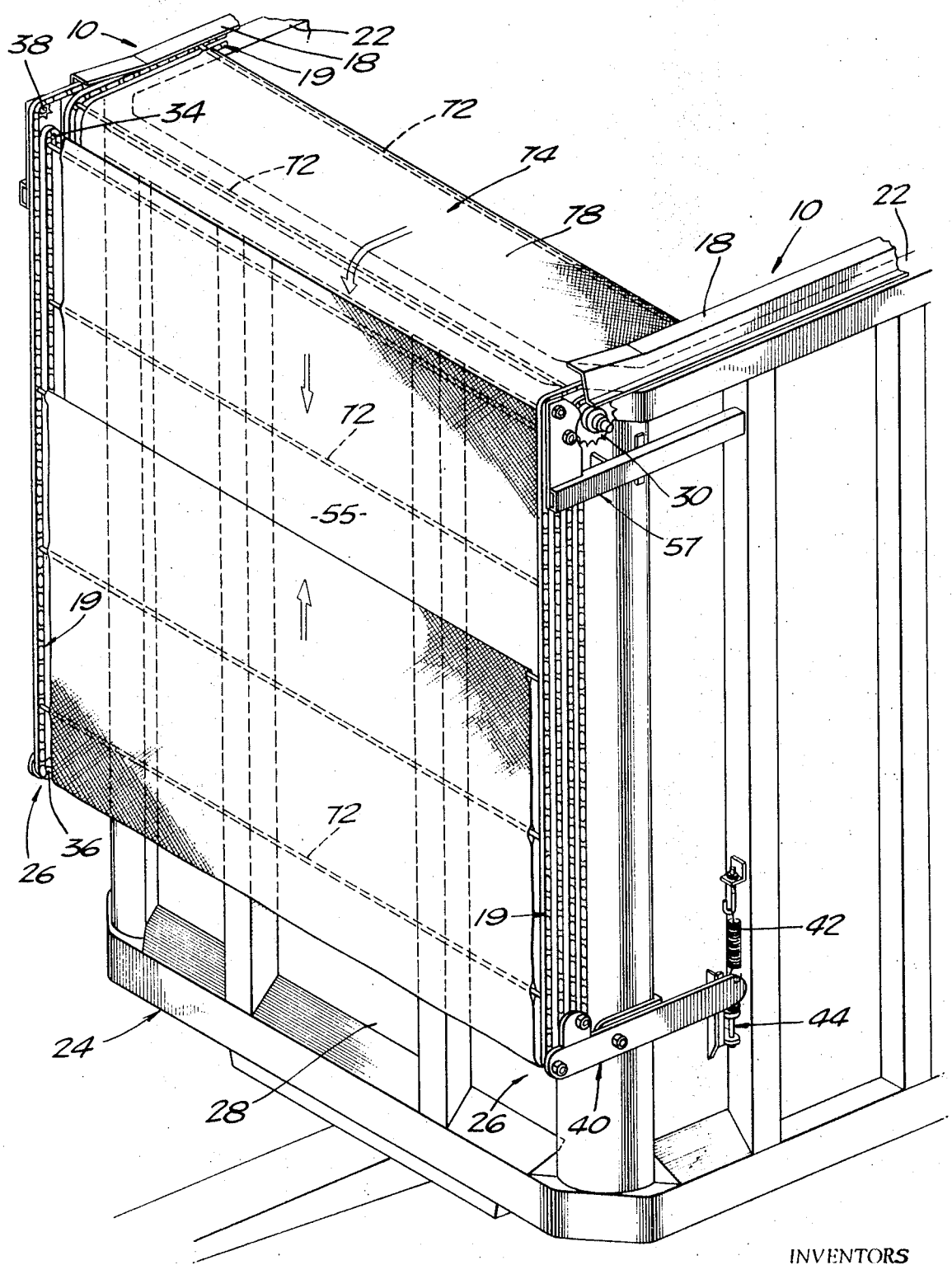

Referring particularly to the drawings, there is illustrated:

FIG. 1, a trash trailer having a retractable load cover of this invention mounted thereon;

FIG. 2, an elevational view of the folding zone with the cover in the fully extended position;

FIG. 3, a broken side elevational view of the conveyor unit in operative position;

FIG. 4, a top plan view of the trailer of FIG. 1 with the cover in the fully extended position and the lateral movement of the trailer sides illustrated in phantom lines;

FIG. 5, a sectional view taken along line 5-5 in FIG. 2;

FIG. 6, a cross-sectional view taken along line 6-6 in FIG. 3;

FIG. 7, a cross-sectional view taken along line 7-7 in FIG. 6;

FIG. 8, a cross-sectional view taken along line 8-8 in FIG. 6;

FIG. 9, a cross-sectional view taken along line 9-9 in FIG. 3;

FIG. 10, a cross-sectional view taken along line 10-10 in FIG. 3;

FIG. 11, a cross-sectional view taken along line 11-11 in FIG. 3;

FIG. 12, a perspective view of one track element for a conveyor unit;

FIG. 13, a perspective view of a sprocket which is utilized with a track element;

FIG. 14, a perspective view of the track elements in operative position with a partially extended cover;

FIG. 15, a perspective view of a folding zone with a cover partially folded therein; and FIG. 16, a schematic perspective view of the retractable cover and conveyor units of this invention.

Referring particularly to the drawings, there is illustrated generally at 10 a pair of track members which are identical except that one is the mirror image of the other. Track members 10 include first track 12 and second track 14. First and second tracks 12 and 14, respectively, are spaced-apart from one another by channel 16. A closed track pathway is defined between the adjacent lateral edges of first track 12 and second track 14. One reach of roller chain 19 is received within the closed pathway, thus defined. The outer opposed edge of second track 14 serves to support and guide the upper reach of roller chain 19. A tracking sprocket 17 is provided at the end of track members 10 to guide roller chain 19 from the closed pathway between tracks 12 and 14 onto the open pathway defined by the outer lateral edge of second track 14. A L-shaped chain guard 18 is mounted over track members 10 so as to protect personnel from contact with chain 19 and also to protect the tracks and chain from being damaged by contact with loading and unloading equipment. The track members 10 are mounted to the upper outer edge 22 of truck box 24 by means of brackets 20. Folding stations 26 are located at the inner ends of track members 10 which are opposite from the outer ends of track members 10 where tracking sprockets 17 are located. Folding stations 26 are located in substantially the same plane occupied by respective tracks 12 and 14. Folding stations 26 extend generally perpendicular to track members 10 downwardly from the outer front side edges of truck box 24. The folding stations 26 are positioned so that the front side 28 of truck box 24 is located between them.

Each of folding stations 26 includes a drive sprocket 30. Spaced from and tangentially aligned with drive sprocket 30 is a first folding sprocket 32. An idler sprocket 34 is spaced from and tangentially aligned with first folding sprocket 32. Second folding sprocket 36 is spaced from and tangentially aligned with idler sprocket 34. Alignment sprocket 38 is positioned so as to receive the upper reach of chain 19 as it passes between the inner end of track member 10 and the upper end of folding station 26. Tension arm 40 is pivoted at about its midpoint and is biased downwardly by the presence of spring 42 at about one end. First and second folding sprockets 32 and 36, respectively, are rotatably mounted on and movable with the other end of tension arm 40. Adjustable stop limit 44 limits the distance through which tension arm 40 can move against spring 42. Folding stations 26 are driven simultaneously by drive motor 46 which is attached to motor sprocket 54. Motor sprocket 54 drives drive chain 48 which in turn drives shaft sprocket 50. Shaft sprocket 50 is mounted on and nonrotatable relative to drive shaft 52. Drive sprockets 30 are mounted at the respective outer ends of drive shaft 52 and rotate therewith. Folding stations 26 taken together define folding zone 55.

The controls for operating the retractable top are illustrated, for example, in FIG. 16. A control box 56 contains a reversing switch for motor 46. Moving the switch in one direction drives the motor so as to close the top, and reversing the operation opens the top. The travel of the top is limited by means of extended limit switch 58 and folded limit switch 60. Even though the switch in control box 56 remains in the actuated configuration, the respective limit switches 58 and 60 serve to prevent the top from cycling completely through the track members and folding station to some undesired position. The contact between the respective limit switches 58 and 60 and the top is accomplished by the limit switch-actuating arm 62 which is carried by chain 19.

The roller chain 19 is of conventional construction, including, as illustrated particularly in FIGS. 6, 7, and 8, rollers 65 rotatably received on roller pins 67 and joined to adjacent like assemblies by links 69. At predetermined regularly spaced intervals along the length of chain 19, the conventional roller pins 67 are replaced with extended pins 66. Shaft 68 is swedged onto extended pin 66. Shaft 68 is received in counterbore 70 of rod 72. The telescoping action of shaft 68 in counterbore 70 permits the side of truck box 24 to flex inwardly and outwardly for a considerable lateral distance, as illustrated particularly in FIG. 4, without in anyway affecting the efficient operation of the retractable cover and without stretching the cover material itself. The rods 72 move with chain 19 along tracks 12 and 14 and through folding stations 26 and remain spaced from one another by the same substantially invariable distance along the length of chain 19. The rods 72 support and carry with them flexible web 74. Flexible web 74 is composed of inner ply 76 and outer ply 78, see particularly FIG. 8.

The track members 10 and folding stations 26, which are mounted on one side of truck box 24, and cooperate together to convey one side of flexible web 74 between its extended and folded positions, define together a conveyor unit 57. The corresponding elements on the other side of truck box 24, which cooperate together to convey the opposed edge of flexible web 74, comprise conveyor unit 59. The elements of conveyor unit 57, including chain 19, the sprockets which define its pathway through folding station 26 and tracks 12 and 14 which guide its forward and reverse reaches along an upper outer edge of truck box 24, occupy substantially the same plane. Likewise, the separate elements of conveyor unit 59 occupy substantially a common plane. The planes containing the respective conveyor units 57 and 59 extend substantially parallel to one another.

The flexible web 74 which forms the cover for the load in truck box 24 is preferably composed of a relatively lightweight material so that the weight of the material flapping under the induced wind generated when the vehicle is drawn at high speeds will not create excessive loads on the respective conveyor units 57 and 59.

The use of a roller chain in the conveyor units is preferred because it is adapted to being precisely indexed on the sprockets so that two container units remain in fixed relationship with respect to one another as they move between the track members and the folding stations. If the moving flexible elements of conveyor units 57 and 59 are not precisely indexed with respect to one another, the rods 72 will tend to become skewed so that flexible web 74 is distorted or torn.

The folding zone 55 may be provided with a shield, not illustrated, if desired. The retractable cover of this invention is applicable to a wide variety of applications in which it is necessary or desirable to provide a remotely operated retractable cover which has a very low profile in the extended position and occupies a relatively small volume in the folded retracted position.

The flexible web material is preferably a synthetic cloth which is not subject to shrinkage when exposed to weathering. Suitable materials include, for example, nylon webbing, polyethylene woven and sheet materials, and the like.

As used herein the term, chain member, includes other flexible conveyor means, such as, for example, cables and the like.

The mechanism used to drive the cover conveyors can be adapted to the particular requirements of the intended use for the cover. Examples of suitable driving mechanisms include power takeoffs, hydraulic motors, electric motors, and the like.

As will be understood by those skilled in the art, what has been described are preferred embodiments in which modifications and changes may be made without departing from the spirit and scope of the accompanying claims.

We claim:

1. A retractable load cover for a vehicular container comprising:

a pair of track elements adapted to be mounted on the upper parallel edges of an open topped container;

a pair of folding means adapted to be mounted on a side of said container adjacent to one end of said track elements;

a pair of chain members, each of said chain members adapted to being driven between a folded position wherein it is guided through a plurality of closely spaced overlaying folds by a said folding means, and an extended position wherein it is guided along an upper edge of said container by a said track element;

means for driving said chain members;

cover support members movable with said chain members between said folded and extended positions; and flexible cover means carried by said cover support members.

2. A retractable cover for a trash trailer comprising:

a pair of track elements, said track elements having first and second ends and being mounted on respective upper parallel edges of said trailer, each of said track elements having a first track and a second track extending parallel to one another in about the same substantially vertical plane, and a guide sprocket between said tracks at the first ends of said track elements, the plane containing the tracks of one track element being substantially parallel to the plane containing the tracks of the other track element;

a pair of folding means, said folding means being mounted adjacent the respective second ends of said track elements on a side of said trailer, each of said folding means having a plurality of sprockets spaced from one another and positioned in substantially the same plane as said tracks, said sprockets defining a closely spaced, overlaying pathway, said pathway having a length at least about as long as said first track, a driver sprocket in each of said folding means, and means for simultaneously driving the driver sprockets in both of said folding means;

a pair of continuous chain members, each of said chain members being movably carried in one plane by a track element and on adjacent folding means;

a plurality of cover support members extending between said chain members, said cover support members including length adjustment means to compensate for variations in the lateral distance between said chain members at different locations in said tracks; and flexible cover means carried by said cover support members.

3. A retractable cover assembly for a vehicular container comprising:

a pair of track elements adapted to be mounted in horizontally spaced parallel relationship on the upper longitudinal edges of said vehicular container, each of said track elements having first and second tracks disposed in close vertically spaced parallel relationship;

a pair of guide sprockets, each being positioned at the rearward end of a corresponding one of said track elements so as to carry a chain therearound and between said first and second tracks of the tracks element;

a pair of folding means adapted to be mounted on the forward end of said vehicular container in a generally perpendicular relationship to said pair of track elements, each of said folding means being disposed adjacent to and being cooperable with the forward end of a corresponding one of said track elements, each of said folding means providing a folded track containing a plurality of closely spaced overlying folds, the total length of said folded track being at least about as great as the length of one of said tracks of said track elements;

said track elements, guide sprockets, and folding means together providing a pair of endless conveyor pathways;

a flexible cover adapted to be supported in a closed position from one pair of tracks of said track elements for covering the load contained within the vehicular container, and adapted to be supported in an open position from said folded tracks of said folding means;

a pair of endless chain means carried by said endless conveyor pathways and cooperable with said cover for transporting said cover between its open and closed positions; and means for diving said endless chain means.

4. A retractable cover as in claim 3 in which each of said folding means includes a plurality of guide members positioned in spaced relationship to each other.

5. A retractable cover as in claim 3 wherein each of said endless chain means consists of an endless chain having one longitudinal portion to which one side of said flexible cover is permanently attached.

6. Apparatus as in claim 5, including a plurality of cover support members adapted to be movable with said chains and extending laterally between said chains, said cover support members being expansible to compensate for variations in the lateral distance between said chains at various locations along said track elements.

7. Apparatus as in claim 6, wherein said cover support members include rods having counterbored ends therein and shafts slidably received in said counterbored ends, said shafts depending laterally from said chains.

8. Apparatus as in claim 6, wherein said cover support members are telescoping rods.

9. Apparatus as in claim 4, wherein each of the chain means includes a roller chain, and the guide members are sprockets.

10. Apparatus as in claim 3, wherein said drive means includes an electric motor, a reversing switch for said motor and a pair of limit switches for limiting the travel of the cover to its closed and open positions respectively.